May 17, 1927.

L. AVORIO

BALLOON CAPABLE OF BEING EMPLOYED AS A CAPTIVE
OBSERVATION BALLOON AND AS A DIRIGIBLE

Filed Nov. 11, 1925   2 Sheets-Sheet 1

INVENTOR
LUIGI AVORIO
BY
ATTORNEYS

May 17, 1927.

L. AVORIO 1,629,374

BALLOON CAPABLE OF BEING EMPLOYED AS A CAPTIVE
OBSERVATION BALLOON AND AS A DIRIGIBLE

Filed Nov. 11, 1925    2 Sheets-Sheet 2

INVENTOR
LUIGI AVORIO
BY
ATTORNEYS

Patented May 17, 1927.

1,629,374

UNITED STATES PATENT OFFICE.

LUIGI AVORIO, OF ROME, ITALY.

BALLOON CAPABLE OF BEING EMPLOYED AS A CAPTIVE OBSERVATION BALLOON AND AS A DIRIGIBLE.

Application filed November 11, 1925, Serial No. 68,403, and in Italy November 29, 1924.

A dirigible balloon is essentially made of an envelope of a more or less elongated form, having a fixed set of wings, a car, generally suspended by means of steel cables, propelling means, rudders and valves.

A captive observation balloon also essentially comprises an envelope of a more or less elongated form, a fixed set of wings, car and valve, but it differs from a dirigible balloon owing to the absence of propelling elements and rudders, the suspension of the car by means of hemp cables to protect it from the danger of electrical discharges and still more on account of the larger dimensions and the special shape of its permanent wing arrangement necessary to obtain a good stability even in very violent winds of 20 to 25 meters rate a second, during which it must just the same be employed.

If it is attempted to employ as an observation balloon a dirigible having the same cubic capacity as that of an observation balloon, by attaching it of course to the mooring cable, certain considerable differences will immediately be perceived between the characteristics of the two types of balloons, which differences prevent the aforesaid substitution. In fact:

(1)—A dirigible balloon has not a sufficient wing arrangement to be enabled, when captive, to keep steady even in winds having a speed of 20 to 25 meters a second. The reason for this is that the pilot aboard can manœuvre the movable rudders thus modifying the total efficiency of the fixed and movable wing arrangement, and rendering them sufficient to keep up the course of the dirigible balloon even if it is of smaller dimensions as a whole.

On the other hand in an observation balloon wherein the sole person on board is required to act as observer, this person cannot occupy his time in keeping the balloon constantly in the right direction; therefore an anchored dirigible, unless furnished with an excessive wing arrangement, is not adapted to act as an observation balloon.

(2)—The weight of the car carrying the propelling gear constitutes a very heavy load which prevents the dirigible from reaching the altitudes which on the other hand are necessary and possible for an observation balloon. Thus, for instance, in a dirigible having a volume of 1000 cubic meters, the weight of the car, of the motors, rudders and accessories, is about 300 kilogrammes and corresponds to a length of anchor cable of about 1650 meters (the cable employed with captive balloons of about 1000 cubic meters capacity weighs about 180 grammes a meter). This captive balloon of about 1000 cubic meters capacity can reach an absolute altitude of 2000 meters. It can thus be seen that a dirigible having an equivalent cubic capacity, when subtracting the loss in altitude due to its greater instability, can hardly reach an altitude of even 360 meters.

(3)—Moreover it is impossible to employ a dirigible, when anchoring it, by means of a lighter cable. On the contrary, in view of its lower stability, it is necessary to hold it by means of a stronger cable than that used with a captive balloon.

(4)—Should it be deemed possible to employ the dirigible in conjunction with a light cable, by utilizing a part of the motive power to overcome the resistance of the wind, and thus reducing tension of the anchoring cable to a minimum, this measure not only would involve a heavy running expense (owing to the high consumption of fuel) and thus greatly limit the observation period (owing to the rapid consumption of the fuel) but still another difficulty which makes the substitution of a dirigible for an observation balloon equally impossible. In fact the vibrations of the motor would not allow observations to be carried out, for which absolute rest is necessary, as long experience during the European war has demonstrated.

(5)—Finally a dirigible balloon (either rigid or semirigid) needs a hangar, whereas the captive balloon does not require any permanent shelter, for it can be hauled down, anchored and camouflaged as it may happen in war.

In conclusion: a dirigible balloon either owing to its instability due to its restricted wing arrangement or owing to the limited altitude to which it can rise, or owing to the vibration of the motor or for economical reasons or duration of service or owing to its dependence on a shelter, cannot, either in theory or in practice, substitute a captive balloon. It has been conceived for navigation but not for remaining stationary and fastened to a cable, a purpose for which the captive balloon is specifically designed.

There is however no question that the provision of aerial means adapted, as the case may be, to be navigated or on the other hand to remain stationary and stable for observation purposes, constitutes a real advantage because it allows two aerial means to be combined in a single apparatus and because the observation service will be greatly facilitated. In fact a balloon provided with its own propelling means can be moved from one place to another within the territory of operations, leaving aground the sole winch which is caused to simultaneously and independently carry out the same displacements, and which may be any motor-car whatever having all the mobility of the latter. It is also possible to keep the balloon at anchorage beyond fire range of the enemy's light artillery and to easily and rapidly remove it to the place where it must be employed. It will also be able to rapidly and easily carry out, for successive use, displacements in a lateral direction without being necessary, as it often happens in connection with the present balloon, either to deflate and subsequently to reinflate it with a considerable loss of time and gas; or to lift it with great difficulty—provided it is possible—over obstacles of all kinds such as telephone wires, high tension cables, canals, walls, houses, roads planted with trees, etc., which always causes at least a considerable loss of precious time.

Now this invention concerns a balloon which can be used either as a captive balloon for observations or as a dirigible, the passage from the one to other way of working being obtained by changing the car and the parts annexed thereto, matters being pre-arranged in such a manner that the said change may take place in a rapid and easy way.

In carrying out this transformation it is clear that it may be started from a balloon originally constructed for observation purposes and that, by its transformation, is adapted to work like a dirigible balloon, but also the contrary transformation may be performed by starting from a dirigible balloon which is modified in such a way as to suitably work as a captive observation balloon, and lastly it is also possible to make use of an intermediate type which permits to be adapted with the same facility to work either as a captive observation balloon or as a dirigible.

And it is exactly in this that the present invention consists.

To carry out this invention, i. e., to transform a captive balloon into a dirigible, when it is necessary to move same from one place to another, the wicker observation car is replaced by a car provided with propelling means, a propeller and even rudders. With regard to the wings it has previously been stated that those of a dirigible are insufficient to make the same stable when attached to a cable, but that, on the other hand, it is possible for an observation balloon to be navigated also with its own wing arrangement, which, it is true, is larger than that of a dirigible, but has no other drawbacks except that to render the movements of the balloon slower and to increase the arc thereof.

On the other hand the manœuvring qualities of a dirigible can be increased by making the wing arrangement of a captive balloon partly detachable so that, when changing the car of the captive balloon, also its wings are partially taken off by substituting them, if necessary, by other wings more suitable for the working of a dirigible.

Consequently, by merely performing a simple and rapid change of the car and of the wing arrangement, it is possible to transform a captive balloon into a dirigible, without changing the type of a balloon as such and without diminishing in any way the necessary and indispensable characteristic of an observation balloon.

In the accompanying drawing, which serves to illustrate by way of example an embodiment of a balloon in accordance with this invention to be used either as a captive observation balloon or as a dirigible:

Figure 1:
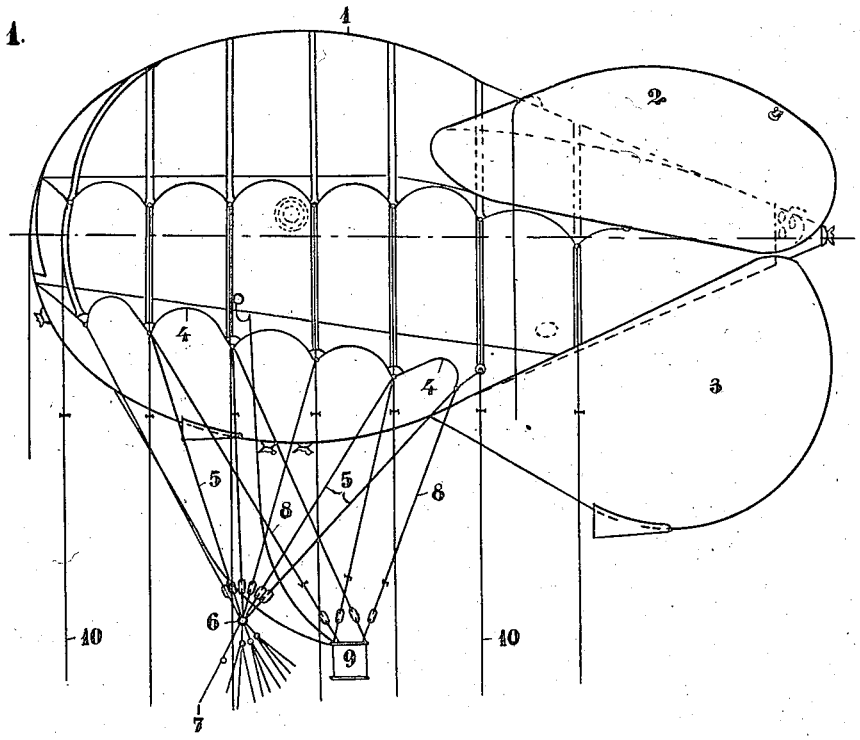
Fig. 1 is a view in lateral elevation of the balloon adapted to work as an observation balloon.

The observation balloon 1 shown in Fig. 1 has its wing arrangement formed of three bags at 120°; of these bags the upper ones 2 are arranged obliquely and the lower one 3 is arranged vertically.

To the envelope 1 by means of catenaries 4 or caparisons are secured the ropes 5 concurring in the fastening knot 6 of the holding cable 7, the suspension ropes 8 for the wicker car 9 designed for the observer and the manœuvring cables 10.

Figure 2:
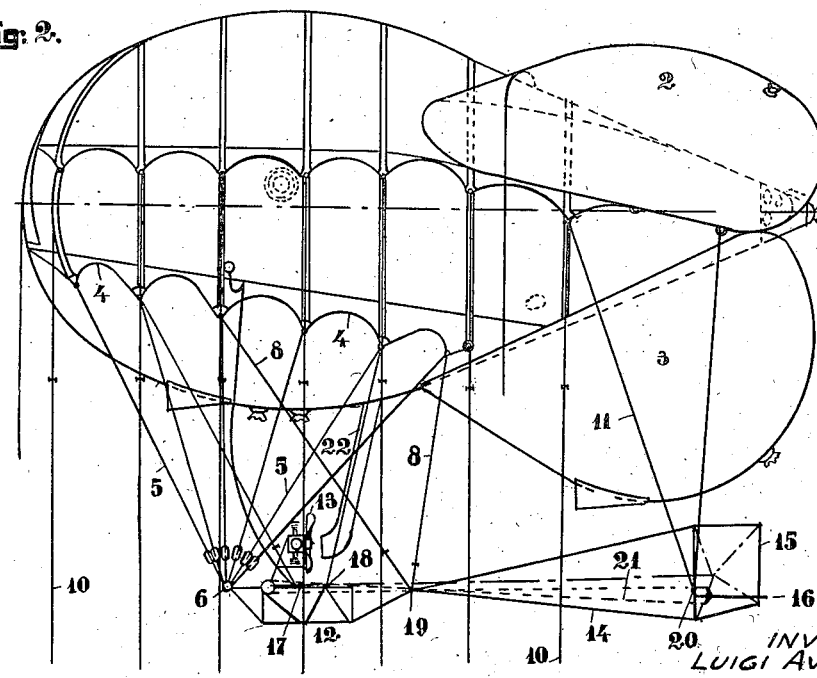
Fig. 2 is a side view of the same with its car changed in order to work as a dirigible.

When this balloon has to move on and to proceed with its own means, for the observation car 9 is substituted, Fig. 2, a navigation car 12 fitted with driving means and the propeller 13, the parts being arranged in such a way as to cause the verticals of the load resultants to coincide.

This measure results in the flight conditions of the observation balloon and of the transformed dirigible remaining invariable.

Car 12 carries at its prow a knot 6 which utilizes all the ascensional forces corresponding to those of the suspension group 5 of the observation balloon.

The suspension cables 8 of the wicker car are fastened at suitable points 17, 18, 19 of the new car 12.

In order to set the guide and altitude rudders without altering the fixed wing arrangement of the observation balloon, the rudders 15, 16 are carried by a tail portion 14 hinged by means of a ball joint to point 19 astern the car and fastened in 20 by means of cables 11 fixed at the envelope of the observation balloon, which cables may however be, for instance, the manœuvring cables 10 in Fig. 1.

By means of said arrangement this tail portion behaves like a beam supported at two points, viz: the point 19 and the point 20 to which the cables 11 are fastened.

The ball joint 19 enables the rigid system comprising the car with its tail portion to follow the variations of the shape of the envelope.

The rudder control ropes 21 which pass very close to joint 19 do not alter in length during the movements of the car and the tail portion and are led to the ordinary control gear of a normal dirigible.

A detachable wind sleeve 22 at the rear of the propeller ensures the required inflation of the balloon in the manner generally adopted for non-rigid dirigibles.

It is to be observed that in a dirigible thus obtained through the transformation of an observation balloon of the type shown in Fig. 1, when maintaining unaltered the original wing arrangement, the upper bags 2 of the latter chiefly slacken the vertical movements while the lower bag 3 is that which slackens the direction movements which are the most important.

Figure 3:
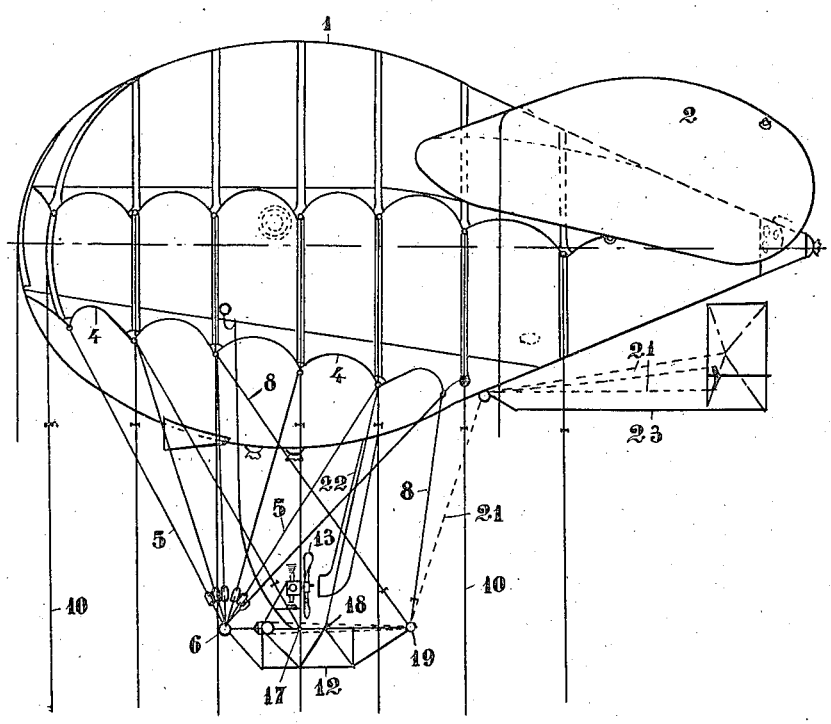
Fig. 3 is a view in a lateral elevation of a dirigible which can be transformed into the observation balloon according to Fig. 1.

It is therefore understood the great advantage which could be obtained by doing away when the captive balloon works as a dirigible, with this lower bag, substituting it in the manner shown in Fig. 3 by a small wing arrangement or flat keel 23 to which are fastened the guide rudder 15 and the altitude rudder 16, like those common to all dirigible balloons and of such a size as to be sufficient to maintain the direction of the dirigible.

And the aforesaid substitution is actually possible and easy, because, as the bag in a captive balloon is designed to be inflated with air, it can always be deflated either for being folded up and fixed by means of caparisons along its attachment line or to take it off altogether by unlacing it from the caparisons which fix it to the envelope.

It is therefore seen that with a simple lacing system of no great length, it is possible to deprive a captive balloon, which is to be transformed into a dirigible, of the greater resistance which it offers to the direction movements and progress, and therefore the navigation becomes easier. At the same time the navigation car 12 is simplified because, as it can be seen in Fig. 3, it has no longer the tail portion with the wing arrangement carried on the top of the envelope.

Thus also the contrary operation is as rapid and easy, when it is the case to transform a dirigible into a captive balloon, as it is only necessary to detach the flat keel wing arrangement and to unroll and refasten the lower bag to allow its air inflation.

The wing arrangement is made integral with the balloon in one of the many manners, all simple and already known, which serve to fix the wing arrangement to non-rigid dirigibles.

Moreover, as to the wing arrangement are already fastened the guide and altitude rudders, by simply attaching it to the balloon also all the movable steering organs are fastened to same.

As it is possible to substitute and reduce the lower wing arrangement of a captive balloon, that is to say, the guide wings, it is, of course, also possible, by proceeding in the same way, to substitute and reduce the upper wing arrangement of the same balloon, that is the altitude wings, to obtain that the characteristics of flight be always brought nearer those of a balloon constructed so as to exclusively work as a dirigible.

Recapitulating: the transformation of a captive balloon into a dirigible is carried out by substituting the car of the captive balloon and, if necessary, a part or all of the wing arrangements by a car supplied with driving means and with the guide and altitude rudders either connected to the car or to the body of the envelope, without modifying in any way the suspension ropes for the cable and for the car, the control and anchoring ropes, the gas valves, the air valves, the wind sleeves, etc.

Moreover, since the navigation car is attached to the envelope by means of hemp ropes, similarly as it is the case in a captive balloon, the present safety against electrical discharges remains unaltered.

Claims:

1. A transformable balloon to be employed as a captive balloon or as a dirigible comprising a gas bag, attachments for the car provided on said gas bag, in combination with two interchangeable cars, viz, an observation car and a propelling car, both provided with suspensions in correspondence with the attachments of the gas bag so that either one of them may be suspended from the gas bag.

2. A propelling car for the transformable balloon according to claim 1, provided with propelling means, with steering gears and with a tail beam jointed to the car to support said steering gears, and suspension means whereby said beam is sustained by the gas bag.

3. A transformable balloon according to claim 1, provided with two interchangeable wing arrangements, viz a system of inflated pneumatic wings, one of which is detachable for use as a captive balloon, and a system of flat wings provided with rudders to be substituted for the detachable inflated wings whenever the balloon is employed as a dirigible.

4. The combination with a gas bag having inflatable wings and provided with a plurality of depending and converging ropes to which an anchoring cable is adapted to be secured and with a plurality of suspension ropes, of a car provided with propelling means and to which the said ropes are secured and by which the car is suspended from the gas bag, a rudder carrying member, and means for supporting the member below the gas bag.

5. The combination with a gas bag having inflatable wings and provided with a plurality of depending and converging ropes having their ends secured together and to which an anchoring cable is adapted to be secured and with a plurality of suspension ropes, of a car provided with propelling means, to the forward end of which the united ends of the said ropes are secured and to the rear end and body the suspension ropes are secured a member having a plurality of rudders, and means for supporting the said member below the rear end of the gas bag.

6. The combination with a gas bag having inflated wings and provided with a plurality of depending and converging ropes having their ends secured together and to which an anchoring cable is adapted to be secured and with a plurality of suspension ropes, of a car having propelling means, to the forward end of which the united ends of said ropes are secured and to the rear end and body the suspension ropes are secured, a tail beam having its forward end jointed to the car and provided with a plurality of rudders, and ropes connecting the said beam to the gas bag.

In testimony whereof I have affixed my signature this 19th day of October, 1925.

LUIGI AVORIO.